United States Patent
Matsuo et al.

(10) Patent No.: US 9,425,475 B2
(45) Date of Patent: Aug. 23, 2016

(54) SOLID OXIDE FUEL CELL SYSTEM RESPONSIVE TO EXPLOSIVE VAPORIZATION OF WATER IN REFORMER TO CONTROL POWER

(71) Applicant: TOTO LTD., Kitakyushu-shi, Fukuoka (JP)

(72) Inventors: Takuya Matsuo, Yokohama (JP); Toshiharu Otsuka, Nakama (JP); Katsuhisa Tsuchiya, Chigasaki (JP)

(73) Assignee: TOTO LTD., Fukuoka (JP)

( * ) Notice: Subject to any disclaimer, the term of this patent is extended or adjusted under 35 U.S.C. 154(b) by 713 days.

(21) Appl. No.: 13/850,087

(22) Filed: Mar. 25, 2013

(65) Prior Publication Data

US 2013/0260271 A1    Oct. 3, 2013

(30) Foreign Application Priority Data

Mar. 27, 2012    (JP) .................................. 2012-071364

(51) Int. Cl.
*H01M 8/06* (2016.01)
*H01M 8/04* (2016.01)
*H01M 8/12* (2016.01)

(52) U.S. Cl.
CPC ......... *H01M 8/0618* (2013.01); *H01M 8/0494* (2013.01); *H01M 8/04425* (2013.01); *H01M 8/04559* (2013.01); *H01M 8/04619* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| 2010/0304242 A1* | 12/2010 | Tsuchiya | C01B 3/38 429/423 |
| 2012/0272575 A1* | 11/2012 | Masui | C01B 3/32 48/61 |

\* cited by examiner

*Primary Examiner* — Ula C Ruddock
*Assistant Examiner* — Tony Chuo
(74) *Attorney, Agent, or Firm* — Brinks Gilson & Lione

(57) ABSTRACT

To provide a fuel cell system with which degradation of fuel cells can be suppressed by avoiding the ill effects caused by bumping of water used for steam reforming during the electrical generation. The present invention is a solid oxide fuel cell system including: a fuel cell module, a fuel flow regulator unit, a reformer for reforming supplied fuel, a vaporizing section for supplying steam to the reformer, a water flow regulator unit, and a controller for controlling the fuel supply device and water supply device, and for controlling the power extracted from the fuel cell module; whereby the controller is furnished with: a bumping determination circuit for determining the occurrence of excessive vaporization of water in a vaporizing chamber, and an extracted power limiting circuit for limiting the power when the bumping determination circuit has determined excessive bumping of water.

6 Claims, 12 Drawing Sheets

SOLID OXIDE FUEL CELL SYSTEM RESPONSIVE TO EXPLOSIVE VAPORIZATION OF WATER IN REFORMER TO CONTROL POWER

RELATED APPLICATIONS

This application claims priority under 35 U.S.C. §119 to Japanese Patent Application No. 2012-071364 filed on Mar. 27, 2012, the entire content of which is hereby incorporated by reference.

TECHNICAL FIELD

The present invention pertains to a solid oxide fuel cell, and more particularly to a solid oxide fuel cell in which supplied fuel is reformed by the addition of steam, and electrical power is produced using the reformed fuel.

BACKGROUND ART

Solid oxide fuel cells ("SOFC" below) use oxide ion conductive solid electrolytes; these are fuel cells which operate at comparatively high temperatures, to which electrodes are attached on both sides, and fuel gas is supplied to one side while oxidant (air, oxygen, etc.) is supplied to the other.

A fuel cell apparatus is described in Published Unexamined Patent Application 2010-277846 (Patent Document 1). In this solid oxide fuel cell apparatus, during the startup process a partial oxidation reforming reaction of the fuel, an autothermal reforming reaction in which the partial oxidation reforming reaction and steam reforming reaction are mixed, and a steam reforming reaction are successively caused to occur inside the reformer, and the temperatures of the reformer and the fuel cell stack are raised to the temperature at which the generating process is possible. Also, in this solid oxide fuel cell apparatus the fuel supply means, reforming air supply means, and water supply means are controlled so that a target fuel supply amount, target air supply amount, and target water supply amount are respectively supplied.

However in the fuel cell apparatus set forth in Published Unexamined Patent Application 2010-277846, water for steam reforming is intermittently supplied by a pulsed pump, so that after reforming water is supplied this water is vaporized in a short period, with the resulting problem that pressures inside the vaporization chamber and reformer temporarily rise. i.e., because it becomes difficult to supply fuel into the reformer when pressure inside the rated reference temperature is elevated, a fuel supply amount detection sensor detects the state whereby the fuel supply amount diminishes to less than the target amount under elevated pressure, judging immediately thereafter that fuel is insufficient, and performing an increase amount control to increase the supply of fuel. However, because in actuality the pressure drops in the next instant, it becomes easy to supply fuel, so that even though the above-described insufficient portion of fuel is not inherently required, it is still supplied, with the resulting problem that fuel is oversupplied.

This type of fuel oversupply problem occurs when there is an autothermal reforming reaction in the startup process, in which the amount of water supplied is particularly small. Therefore in the fuel cell apparatus set forth in Published Unexamined Patent Application 2010-277846, a stable autothermal reforming reaction can be implemented by suppressing changes in the amount of fuel supplied by the fuel supply means in the autothermal reforming reaction during the startup process.

PRIOR ART REFERENCES

Patent References

Patent Document 1
Published Unexamined Patent Application 2010-277846.

SUMMARY OF THE INVENTION

However, the present inventors discovered a new problem, which is that ill effects caused by instantaneous vaporization (bumping) of water of the type described in Published Unexamined Patent Application 2010-277846 occur not only when water is intermittently supplied, but also when it is continuously supplied. Additionally, they discovered the problem that ill effects caused by intermittent vaporization of water occur not only during the autothermal reforming reaction in the startup process, but also during generating operation, are associated with degradation of fuel cells. Moreover, during generating operation, per the invention set forth in Published Unexamined Patent Application 2010-277846, it is difficult to suppress changes in fuel supply amounts, and it has not been possible to sufficiently resolve the ill effects caused by instantaneous vaporization of water.

Therefore the present invention has the object of providing a solid oxide fuel cell with which the degradation of fuel cells can be suppressed by avoiding the ill effects caused by bumping of water used for steam reforming during electrical generating operation.

In order to resolve the above-described problems, the present invention is a solid oxide fuel cell system for generating electrical power using reformed fuel reformed by adding steam to supplied fuel, comprising: a fuel cell module including a fuel cell stack; a fuel supply device that supplies fuel; a reformer that reforms fuel supplied from the fuel supply device by adding steam to the supplied fuel and supplying same to the fuel cell stack; a vaporization chamber disposed on the upstream side of the reformer for supplying steam vaporized therein to the reformer; a water supply device that supplies water to the vaporization chamber; a controller programmed to control the fuel supply device and the water supply device, and to control the power extracted from the fuel cell module; wherein the controller includes a bumping determination circuit and an extracted power limiting circuit, wherein the bumping determination circuit determines the occurrence of excessive and sudden vaporization of water in the vaporization chamber, and wherein the extracted power limiting circuit limits power extracted from the fuel cell module when the bumping determination circuit determines that excess bumping of water is happen.

In the present invention thus constituted, the controller controls the fuel supply device and water supply device and also controls power extracted from the fuel cell module. Water supplied from the water supply device is vaporized in the vaporization chamber erected on the upstream side of the reformer; the reformer steam reforms fuel supplied from the fuel supply device using steam vaporized in the vaporization chamber, supplying it to the fuel cell stack built into the fuel cell module. A bumping determination device determines excessive bumping of water in the vaporization chamber, and the extracted power limiting device limits power extracted from the fuel cell module if excessive bumping of water is determined.

Bumping, which is the rapid vaporization of water occurring in the vaporization chamber, is a phenomenon caused by temperature unevenness in the vaporization chamber, and is difficult to fully suppress even when water is continuously supplied. The present inventors discovered the new technical problem that this type of bumping also occurs frequently during fuel cell module generating operation, and also has a negative effect on the fuel cell stack when major bumping occurs inside the vaporization chamber. This is because when major bumping occurs within the vaporization chamber, pressure inside the reformer rises for a certain period, during which it is difficult to introduce fuel into the reformer, causing the fuel cell stack to temporarily go into a "fuel depletion" state or "fuel shortage" state. Occurrences of the "fuel depletion" state or "fuel shortage" state cause degradation of the fuel cell stack and shorten the usable life years of the fuel cell stack.

The present invention was undertaken to resolve such newly discovered technical problems; when there is a determination of excessive bumping of water in a vaporization chamber by a bumping determination circuit, power extracted from a fuel cell module is limited by an extracted power limiting circuit. Thus extraction of power exceeding electrical generation capacity from a fuel cell stack in which generating capacity has been lowered by the effects of bumping in the vaporization chamber is suppressed, therefore degradation of the fuel cell stack is suppressed, and usable life years can be dramatically increased.

Preferably, the present invention further comprises a dispersion chamber and a fuel supply amount detection circuit that detects the fuel supply amount fed into the reformer; wherein the dispersion chamber accumulates fuel reformed in the reformer and disperses and supplies the fuel to each of individual fuel cell units of the fuel cell stack, and wherein the bumping determination circuit determines that excessive bumping of water has occurred when the fuel supply amount detection circuit continuously detects a decrease of supplied fuel more than predetermined amount relative to a target fuel supply amount for a predetermined time duration or more.

In the present invention thus constituted, the dispersion chamber accumulates fuel reformed in the reformer and disperses and supplies reformed fuel to each of the individual fuel cell units. Therefore a time lag is produced after fuel introduced into the reformer diminishes until the effects thereof reach each of the individual fuel cell units. If the state of reduced fuel supply amount continues for a predetermined period or greater, the bumping determination circuit determines that excessive bumping of water has occurred.

In the present invention thus constituted, there is a time lag until the effects of fuel diminishment reach each of the individual fuel cell units, therefore the bumping determination circuit determines excessive bumping after confirming whether the drop in fuel supply amount has continued for a predetermined time period or not, and negative effects on each of the individual fuel cell units can be sufficiently suppressed even if power limiting is implemented. Thus the occurrence of excessive bumping can be accurately determined, and operation of the fuel cell module can be prevented from becoming unstable as the result of repeated unnecessary limitations of power caused by false determinations.

Preferably, the present invention further comprises an output voltage detection circuit for detecting the output voltage of the fuel cell module; wherein the bumping determination circuit determines that excessive bumping of water has occurred when the output voltage detection circuit detects a decrease of the output voltage more than predetermined amount relative to a target output voltage.

The present invention discovered a new technical problem, which is that reliably determining excessive bumping of an extent that will affect the generating capacity of a fuel cell stack is difficult. In the present invention thus constituted, excessive bumping of water is determined by a drop in output voltage, therefore reliable control of bumping can be executed even when excessive bumping of water can not be detected by a determination based on fuel supply amount. Also, because "fuel depletion" or "fuel shortages" based on excessive bumping of water continue for a certain period, ill effects on the fuel cell stack are sufficiently ameliorated even when responding to bumping after the occurrence of a drop in output voltage.

In the present invention the extracted power limiting circuit maintains power extraction from the fuel cell module at least a predetermined amount even when power extracted from the fuel cell module is being limited.

In general, even if excessive bumping occurs in the vaporization chamber, the amount of fuel supplied does not go to zero. In this type of state, completely stopping the extraction of power from the fuel cell module results in all of the supplied fuel being utilized to heat the inside of the fuel cell module, such that the temperature inside the fuel cell module rises excessively. In the present invention thus constituted, the extraction of power at or above a predetermined amount is maintained even when power is being limited, therefore excessive temperature rises in the fuel cell module can be prevented while avoiding "fuel depletion" or "fuel shortages" in the fuel cell stack.

In the present invention when the power generated by the fuel cell module is large, the extracted power limiting circuit limits the power extracted from the fuel cell module much more than when generated power is small.

In general, the solid oxide fuel cell is controlled so that the fuel utilization rate is high when generated power is large, and the fuel utilization rate is low when generated power is small. In the present invention thus constituted, power is more greatly limited when generated power is large than when it is small, therefore "fuel depletion" and "fuel shortage" can be reliably avoided when power is large, which is when the fuel utilization rate is high, while at the same time unnecessary limiting of power can be prevented when power is small.

In the present invention when electrical generation by the fuel cell module is below a predetermined amount, the extracted power limiting circuit does not limit power extracted from the fuel cell module.

In the present invention thus constituted, in the region in which generated power (current) is at or below a predetermined amount, where it is clear that "fuel depletions" or "fuel shortages" caused by excessive bumping do not occur, power limiting is not performed, therefore unnecessary power limiting can be avoided by a simple control. Also, in the small generated power state, frequent limiting of power reduces the occurrence of electrical generation heat, so that while there is a risk that the interior of the fuel cell module will be excessively cooled, this can be avoided using the present invention constituted as described above.

Using the present invention, degradation of fuel cells can be suppressed by avoiding the ill effects caused by bumping of water used for steam reforming during electrical generating operation.

DETAILED DESCRIPTION OF THE PREFERRED EMBODIMENTS

Next, referring to the attached drawings, we discuss a solid oxide fuel cell (SOFC) according to an embodiment of the present invention.

Figure 1:
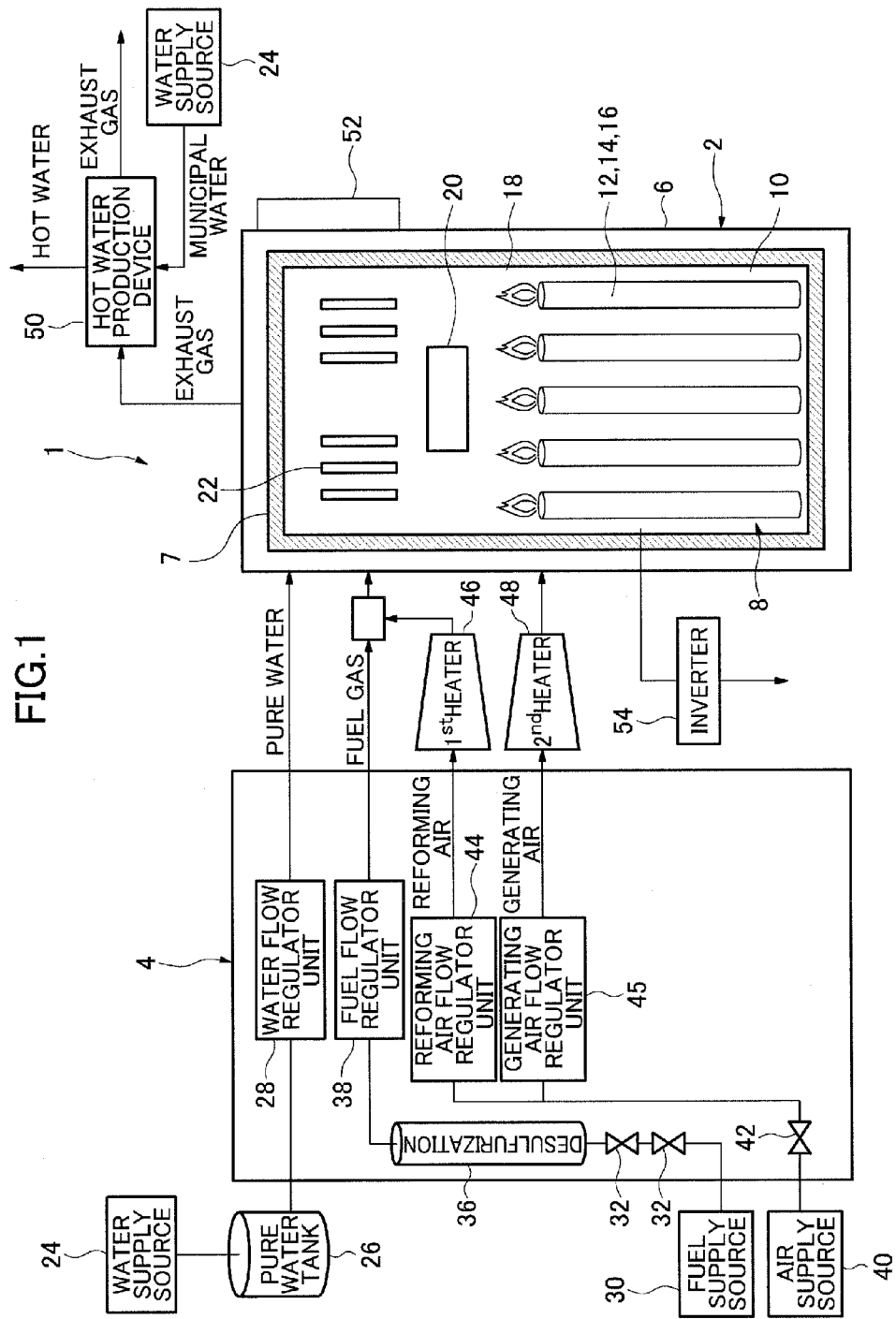
FIG. 1 is an overview diagram showing a solid oxide fuel cell according to an embodiment of the present invention.

FIG. 1 is an overview diagram showing a solid oxide fuel cell (SOFC) according to an embodiment of the present invention. As shown in FIG. 1, the solid oxide fuel cell (SOFC) of this embodiment of the present invention is furnished with a fuel cell module 2 and an auxiliary unit 4.

Fuel cell module 2 is furnished with a housing 6, and a sealed space 8 is formed within this housing 6, mediated by heat insulation 7. Disposed on generating chamber 10, which is the lower part of this sealed space 8, is a fuel cell assembly 12 for carrying out a generating reaction using fuel and oxidant (air). This fuel cell assembly 12 is furnished with ten fuel cell stacks 14 (see FIG. 5), and fuel cell stacks 14 comprise 16 fuel cell units 16 (see FIG. 4). Thus, fuel cell assembly 12 has 160 fuel cell units 16, all of which are serially connected.

A combustion chamber 18 is formed above the aforementioned generating chamber 10 in fuel cell module 2 sealed space 8; residual fuel gas and residual oxidizer (air) not used in the electrical generation reaction are burned in this combustion chamber 18, producing exhaust gas.

Disposed at the top of combustion chamber 18 is a reformer 20 for reforming fuel; this heats reformer 20 to a temperature at which the reforming reaction is possible using combustion heat from the residual gas. Furthermore, an air heat exchanger 22 is disposed on the top of this reformer 20 for receiving heat from the reformer 20 and heating air so as to restrain temperature drops in the reformer 20.

Next, auxiliary unit 4 is furnished with a pure water tank 26 for holding water from a municipal or other water supply source 24 and filtering it into pure water, and a water flow regulator unit 28 (a "water pump" or the like driven by a motor) for regulating the flow volume of water supplied from the reservoir tank. Auxiliary unit 4 is furnished with a gas shutoff valve 32 for shutting off gas supplied from municipal gas or other fuel supply source 30, a desulfurizer 36 for removing sulfur from fuel gas, and a fuel flow regulator unit 38 (a motor-driven "fuel pump" or the like) for regulating the flow volume of fuel gas. Furthermore, an auxiliary unit 4 is furnished with an electromagnetic valve 42 for shutting off air serving as an oxidizer and supplied from an air supply source 40, a reforming airflow regulator unit 44 and generating airflow regulator unit 45 ("air blower" or the like driven by a motor) for regulating airflow volume, a first heater 46 for heating reforming air supplied to the reformer 20, and a second heater 48 for heating generating air supplied to the generating chamber. This first heater 46 and second heater 48 are provided in order to efficiently raise the temperature at startup, but may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to fuel cell module 2.

Figure 2:
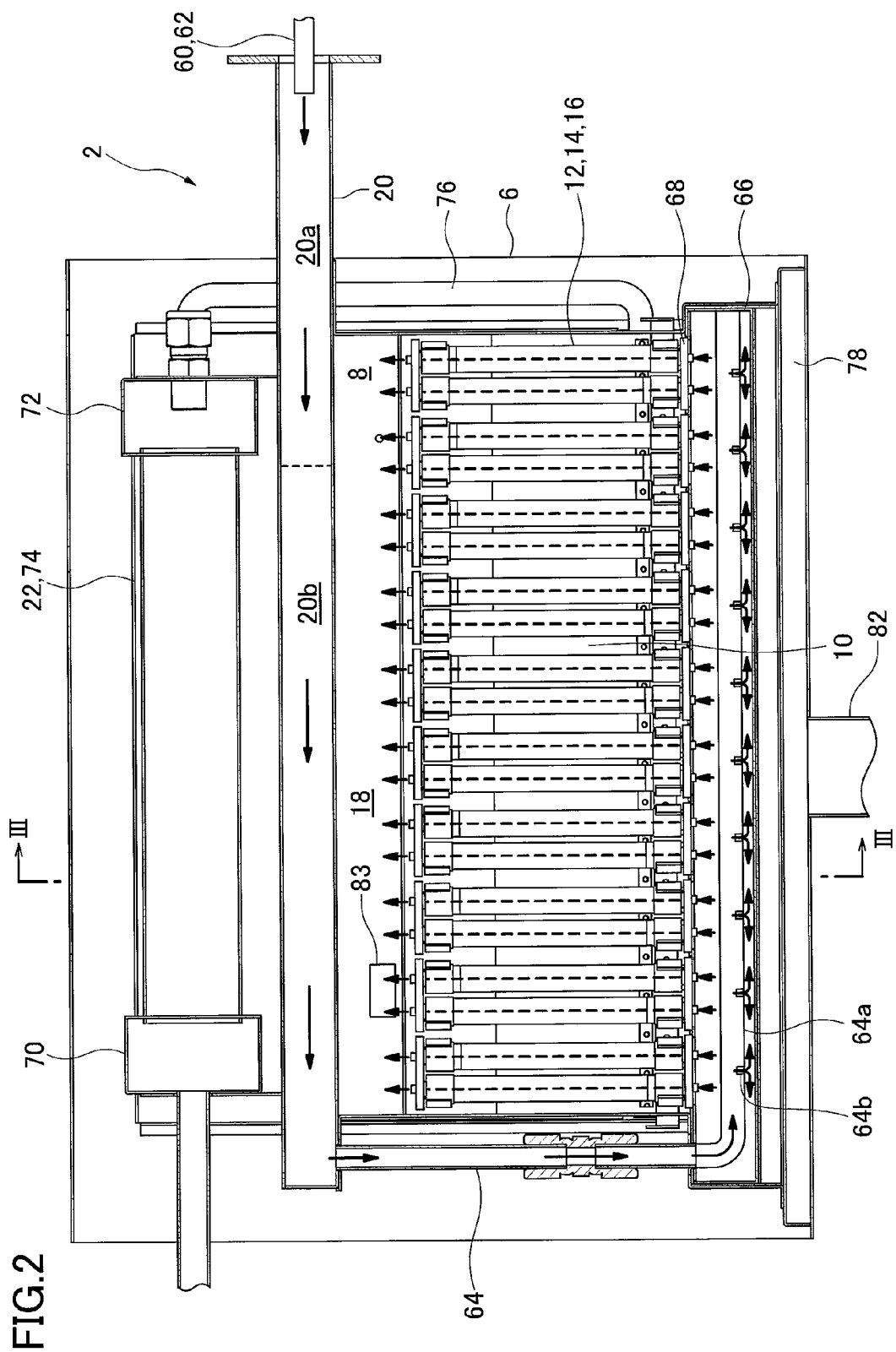
FIG. 2 is a front elevation cross section showing the fuel cell module of a fuel cell apparatus according to an embodiment of the present invention.
Figure 3:
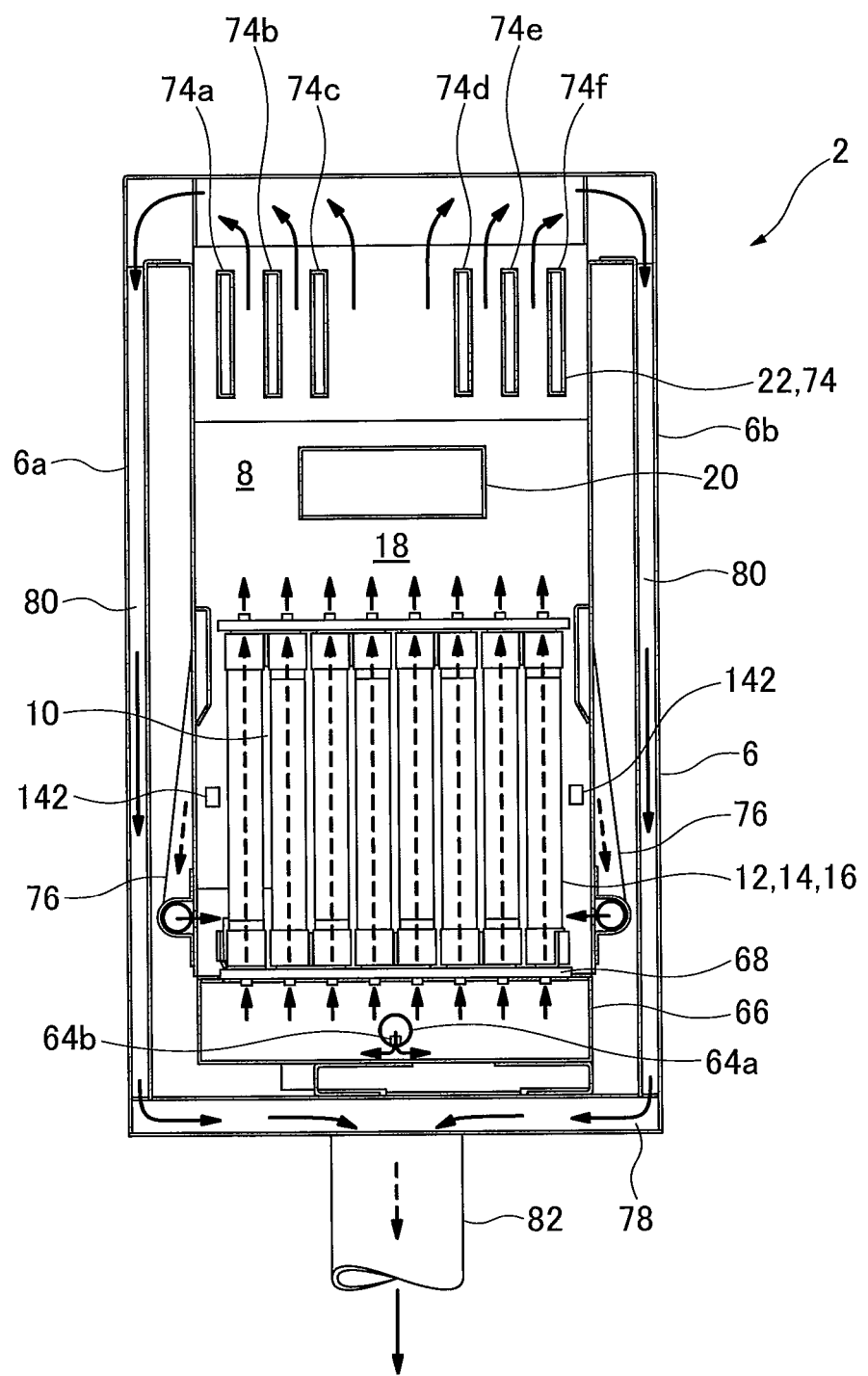
FIG. 3 is a sectional diagram along line III-III in FIG. 2.

The internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention; FIG. 3 is a sectional diagram along line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of reformer 20, and a reform gas guide pipe 62 for introducing the fuel gas and reforming air to be reformed, are attached to reformer 20; a vaporizing section 20a and a reforming section 20b are formed in sequence starting from the upstream side within reformer 20, and these reforming sections 20*a* and 20*b* are filled with a reforming catalyst. Fuel gas and air blended with the steam (pure water) introduced into reformer 20 are reformed by the reforming catalyst used to fill in reformer 20. Appropriate reforming catalysts are used, such as those in which nickel is imparted to the surface of aluminum spheres, or ruthenium is imparted to the surface of aluminum spheres.

A fuel gas supply line 64 is connected to the downstream end of reformer 20; this fuel gas supply line 64 extends downward, then further extends horizontally within a manifold formed under fuel cell assembly 12. Multiple fuel supply holes 64*b* are formed on the bottom surface of a horizontal portion 64*a* of fuel gas supply line 64; reformed fuel gas is supplied into manifold 66 from these fuel supply holes 64*b*.

A lower support plate 68 provided with through holes for supporting the above-described fuel cell stack 14 is attached at the top of manifold 66, and fuel gas in manifold 66 is supplied into fuel cell units 16.

Next, an air heat exchanger 22 is provided over reformer 20. This air heat exchanger 22 is furnished with an air concentration chamber 70 on the upstream side and two air distribution chambers 72 on the downstream side; this air concentration chamber 70 and the distribution chambers 72 are connected using six airflow conduits 74. Here, as shown in FIG. 3, three airflow conduits 74 form a set (74*a*, 74*b*, 74*c*, 74*d*, 74*e*, 74*f*); air in the air concentration chamber 70 flows from each set of the airflow conduits 74 to the respective air distribution chambers 72.

Air flowing in the six airflow conduits airflow conduits 74 of the air heat exchanger 22 is pre-heated by rising combustion exhaust gas from combustion chamber 18.

Air guide pipes 76 are connected to each of the respective air distribution chambers 72; these air guide pipes 76 extend downward, communicating at the bottom end side with the lower space in generating chamber 10, and introducing preheated air into generating chamber 10.

Next, an exhaust gas chamber 78 is formed below manifold 66. As shown in FIG. 3, an exhaust gas conduit 80 extending in the vertical direction is formed on the insides of front surface 6*a* and rear surface 6*b* which form the faces in the longitudinal direction of housing 6; the top inside of exhaust gas chamber conduit 80 communicates with the space in which air heat exchanger 22 is disposed, and the bottom end side communicates with exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on combustion chamber 18.

Figure 4:
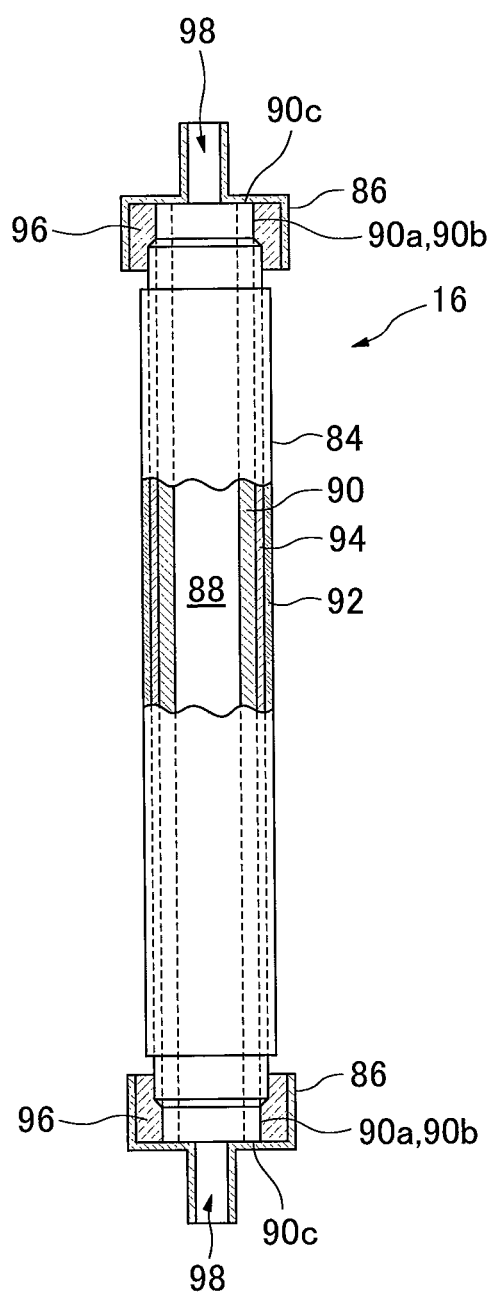
FIG. 4 is a partial cross section showing an individual fuel cell unit in a fuel cell apparatus according to an embodiment of the present invention.

Next, referring to FIG. 4, we discuss fuel cell units 16. FIG. 4 is a partial section showing a solid oxide fuel cell (SOFC) fuel cell unit according to an embodiment of the present invention.

As shown in FIG. 4, fuel cell units 16 are furnished with a fuel cell 84 and internal electrode terminals 86, respectively connected to the respective terminals at the top and bottom of fuel cell 84.

Fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between internal electrode layer 90 and external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom end of fuel cell units 16 have the same structure, therefore we will here discuss specifically the internal electrode terminal 86 attached at the top and side. The top portion 90*a* of inside electrode layer 90 is furnished with an outside perimeter surface 90*b* and top end surface 90*c*, exposed to electrolyte layer 94 and outside electrode layer 92. Inside electrode terminal 86 is connected to the outer perimeter surface of inside electrode layer 90 through a conductive seal material 96, and is electrically connected to inside electrode layer 19 by making direct contact with the top end surface 90*c* of inside electrode layer 90. A fuel gas flow path 98 communicating with the inside electrode layer 90 fuel gas flow path 88 is formed at the center portion of inside electrode terminal 86.

Inside electrode layer 90 is formed, for example, from at least one of a mixture of Ni and zirconia doped with at least one type of rare earth element selected from among Ni, Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
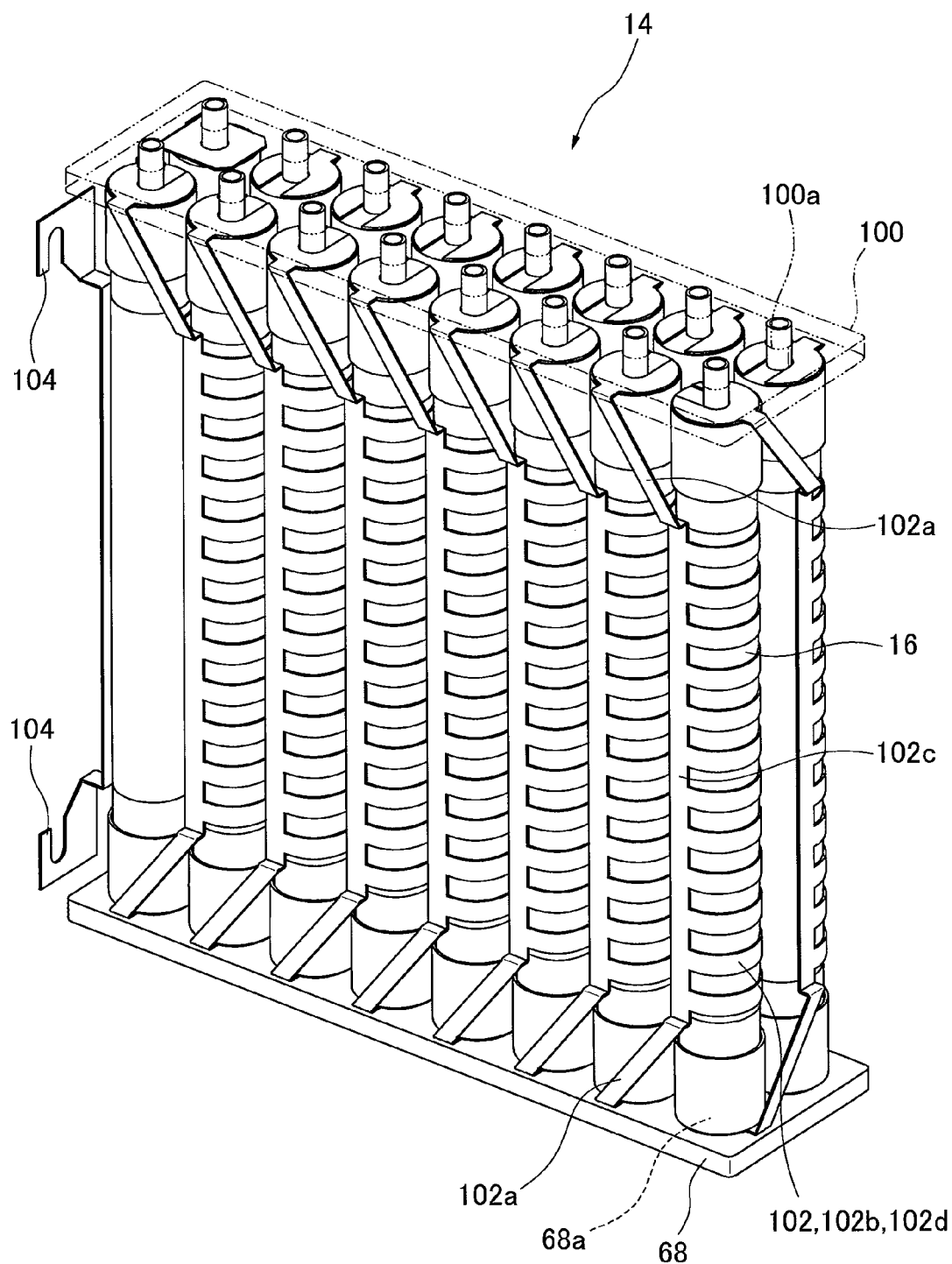
FIG. 5 is a perspective view showing a fuel cell stack in a fuel cell apparatus according to an embodiment of the present invention.

Next, referring to FIG. 5, we discuss fuel cell stack 14. FIG. 5 is a perspective view showing the fuel cell stack in a solid oxide fuel cell (SOFC) according to an embodiment of the present invention.

As shown in FIG. 5, fuel cell stack 14 is furnished with sixteen fuel cell units 16; the top inside and bottom inside of these fuel cell units 16 are respectively supported by a lower support plate 68 and upper support plate 100. Through holes 68*a* and 100*a*, through which the inside electrode terminal 86 can penetrate, are provided on this lower support plate 68 and outer support plate 100.

In addition, a collector 102 and an external terminal 104 are attached to fuel cell units 16. This collector 102 is integrally formed by a fuel electrode connecting portion 102*a*, which is electrically connected to inside electrode terminal 86 attached to inside electrode layer 90 serving as the fuel electrode, and by an air electrode connecting portion 102*b*, which is electrically connected to the entire external perimeter of outside electrode layer 92 serving as the air electrode. The air electrode connecting portion 102*b* is formed of a vertical portion 102*c* extending vertically along the surface of outside electrode layer 92, and multiple horizontal portions 102*d* extending in the horizontal direction from this vertical portion 102*c* along the surface of outside electrode layer 92. Fuel electrode connecting portion 102*a* extends linearly in an upward or downward diagonal direction from the vertical portion 102*c* of air electrode connecting portion 102b toward inside electrode terminals 86 positioned in the upper and lower directions on fuel cell units 16.

Furthermore, electrode terminals 86 at the top and bottom ends of the two fuel cell units 16 positioned at the end of fuel cell stack 14 (at the front and back sides on the left edge in FIG. 5) are respectively connected to outside terminals 104. These external terminals 104 are connected to external terminals 104 (not shown) at the ends of adjacent fuel cell stack 14, and as described above, all of the 160 fuel cell units 16 are connected in series.

Figure 6:
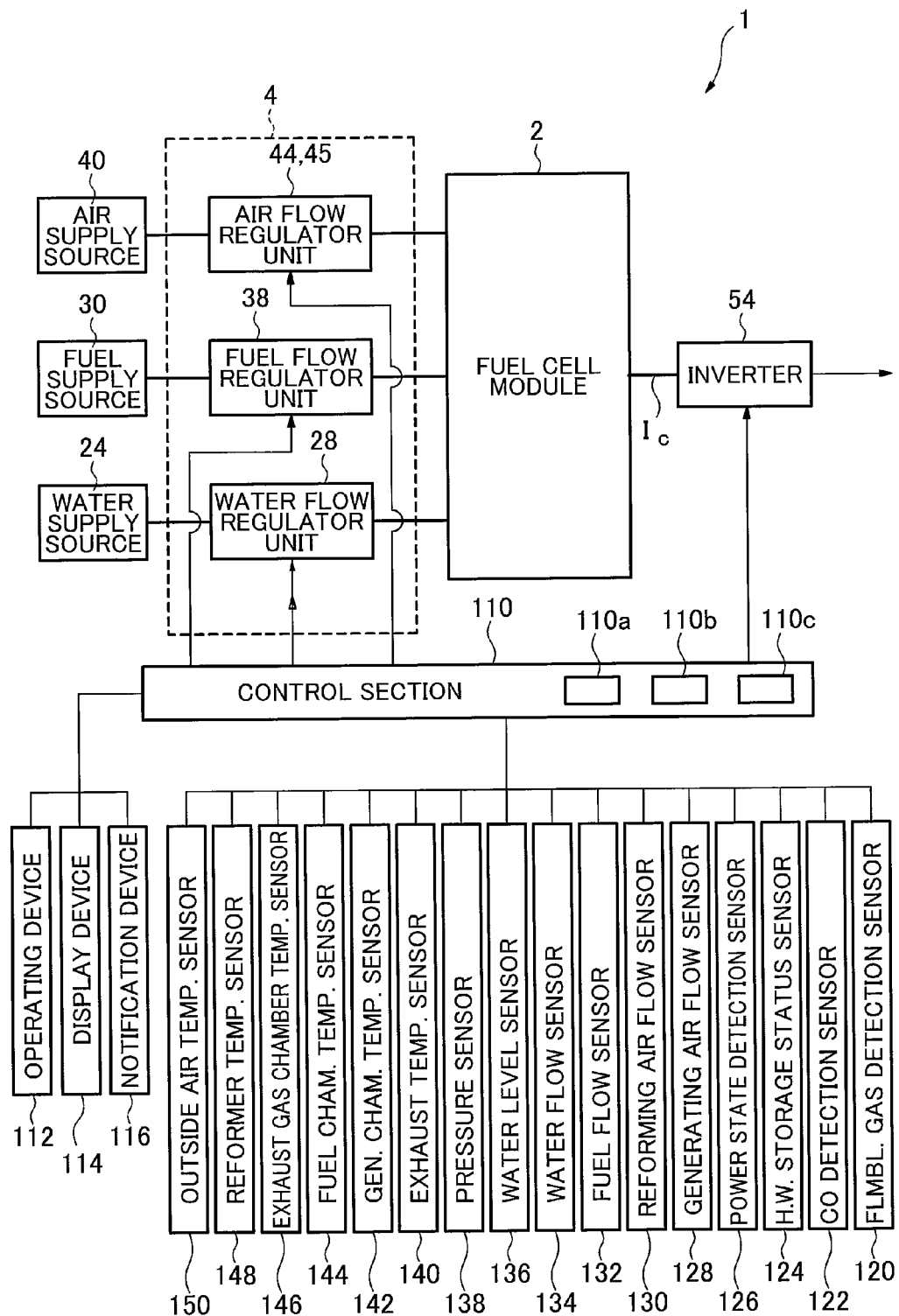
FIG. 6 is a block diagram showing a fuel cell assembly according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 is furnished with a control unit 110; connected to this control section 110 are: an operating device 112 provided with operating buttons such as "ON" or "OFF" for user operation, a display device 114 for displaying various data such as a generator output value (Watts), and a notification device 116 for issuing warnings during abnormal states and the like. This notification device 116 may also be one which is be connected to a remote control center to inform this control center of abnormal states.

Next, signals from the various sensors described below are input to control unit 110.

First, flammable gas detection sensor 120 is for detecting gas leaks; it is attached to fuel cell module 2 and auxiliary unit 4.

The purpose of flammable gas detection sensor 120 is to detect whether CO in the exhaust gas, which is supposed to be exhausted to the outside via exhaust gas conduit 80, has leaked into the external housing (not shown) which covers fuel cell module 2 and auxiliary unit 4.

A water reservoir state detection sensor 124 detects the temperature and amount of hot water in a water heater (not shown).

An electrical power state detection sensor 126 detects current, voltage, and the like in inverter 54 and in a distribution panel (not shown).

A generator airflow detection sensor 128 detects the flow volume of generator air supplied to generating chamber 10.

A reforming airflow volume sensor 130 detects the volume of reforming airflow supplied to reformer 20.

A fuel flow volume sensor 132 detects the flow volume of fuel gas supplied to reformer 20.

A water flow volume sensor 134 detects the flow volume of pure water supplied to reformer 20.

A water level sensor 136 detects the water level in pure water tank 26.

A pressure sensor 138 detects pressure on the upstream side outside reformer 20.

An exhaust temperature sensor 140 detects the temperature of exhaust gas flowing into hot water producing device 50.

As shown in FIG. 3, a generating chamber temperature sensor 142 is disposed on the front surface side and rear surface side around fuel cell assembly 12; its purpose is to detect the temperature near fuel cell stack 14 and estimate the temperature of fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in exhaust gas chamber 78.

A reformer temperature sensor 148 detects the temperature of reformer 20 and calculates the reformer 20 temperature from the intake and exit temperatures on reformer 20.

If the solid oxide fuel cell (SOFC) is placed outdoors, outside temperature sensor 150 detects the temperature of the outside atmosphere. Sensors to detect outside atmospheric humidity and the like may also be provided.

Signals from these various sensor types are sent to control unit 110; control unit 110 sends control signals to water flow regulator unit 28, fuel flow regulator unit 38, reforming airflow regulator unit 44, and generating airflow regulator unit 45 based on data from the sensors, and controls the flow volumes in each of these units.

Figure 7:
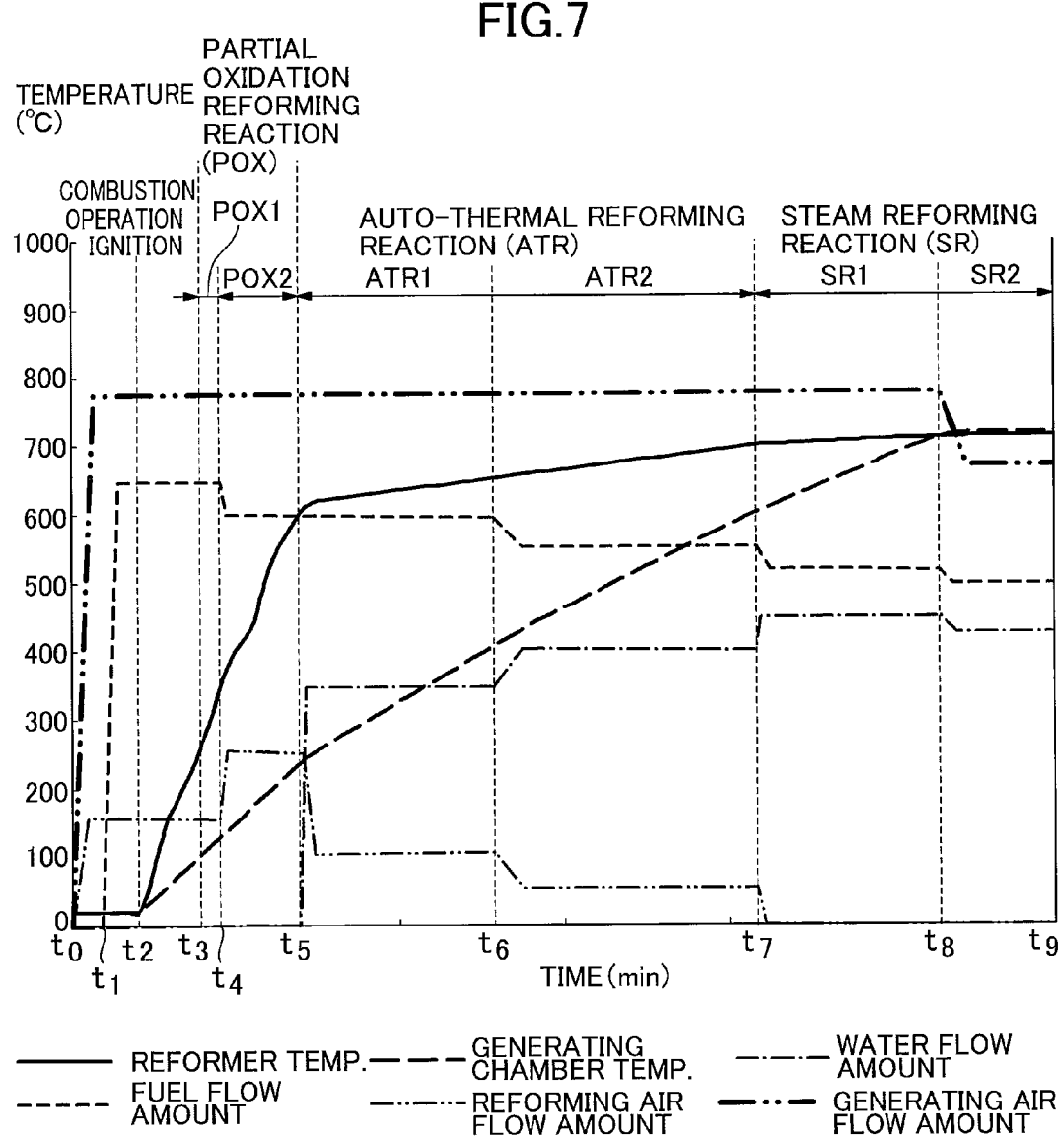
FIG. 7 is a timing chart showing the operation at startup of a fuel cell assembly according to an embodiment of the present invention.

Next, referring to FIG. 7, we discuss the operation of a solid oxide fuel cell (SOFC) according to the present embodiment at the time of start up. FIG. 7 is a timing chart showing the operations of a solid oxide fuel cell (SOFC) according to an embodiment of the present invention at the time of start up.

At the beginning, operation starts in a no-load state, i.e., with the circuit which includes fuel cell module 2 in an open state, in order to warm up fuel cell module 2. At this point current does not flow in the circuit, therefore fuel cell module 2 does not generate electricity.

First, reforming air is supplied from reforming airflow regulator unit 44 to reformer 2 on fuel cell module 2. At the same time, generating air is supplied from generating airflow regulator unit 45 to fuel cell module 2 air heat exchanger 22, and this generating air reaches generating chamber 10 and combustion chamber 18.

Immediately thereafter, fuel gas is also supplied from fuel flow regulator unit 38, and fuel gas into which reforming air is blended passes through reformer 20, fuel cell stack 14, and fuel cell units 16 to reach combustion chamber 18.

Next, ignition is brought about by the ignition device 83, and fuel gas and air (reforming air and generating air) supplied to combustion chamber 18 is combusted. This combustion of fuel gas and air produces exhaust gas; generating chamber 10 is warmed by this exhaust gas, and when the exhaust gas rises into fuel cell module 2 sealed space 8, the fuel gas, which includes reforming air in reformer 20, is warm, as is the generating air inside air heat exchanger 22.

At this point, fuel gas into which reforming air is blended is supplied to reformer 20 by fuel flow regulator unit 38 and reforming airflow regulator unit 44, therefore the partial oxidation reforming reaction POX given by Expression (1) proceeds. This partial oxidation reforming reaction POX is an exothermic reaction, and therefore has favorable starting characteristics. This elevated-temperature fuel gas is supplied from fuel gas supply line 64 to the bottom of fuel cell stack 14, and by this means fuel cell stack 14 is heated from the bottom; combustion chamber 18 is also heated by the combustion of the fuel gas and air, so that fuel stack 14 is also heated from above, thereby enabling an essentially uniform rise in temperature in the vertical direction of fuel cell stack 14. Even though the partial oxidation reforming reaction POX is progressing, the ongoing combustion reaction between fuel gas and air is continued in combustion chamber 18.

$$C_mH_n+xO_2 \rightarrow aCO_2+bCO+cH_2 \qquad (1)$$

After the partial oxidation reforming reaction starts, when fuel cell stack 14 senses that reformer 20 has reached a predetermined temperature (e.g., 600° C.), a premixed gas of fuel gas and reforming air is supplied to reformer 20 by water flow regulator unit 28, fuel flow regulator unit 38, and reforming airflow regulator unit 44. At this point, an autothermal reforming reaction ATR, which makes use of both the aforementioned partial oxidation reforming reaction POX and the steam reforming reaction SR described below, proceeds in reformer 20. This auto-thermal reforming reaction ATR can be internally thermally balanced, therefore the reaction proceeds in a thermally independent fashion inside reformer 20. In other words, if oxygen (air) is abundant, heat emission by the partial oxidation reforming reaction POX dominates, and if steam is abundant, the endothermic steam reforming reaction SR dominates. At this stage, the initial stage of startup has passed and some degree of elevated temperature has been achieved within generating chamber 10, therefore even if the endothermic reaction is dominant, no major drop in temperature will be caused. Also, the combustion reaction continues within combustion chamber 18 even as the auto-thermal reforming reaction ATR proceeds.

When reformer temperature sensor 146 senses that reformer 20 has reached a predetermined temperature after starting autothermal reforming reaction ATR (e.g., 700° C.), the supply of reforming air by reforming airflow regulator unit 44 is stopped and the supply of steam by water flow regulator unit 28 is increased. A gas containing no air and only containing fuel gas and steam is thus supplied to the reformer 20, where the steam reforming reaction SR of Expression (3) proceeds.

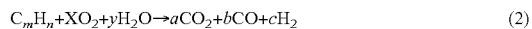
$$C_mH_n + XO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as thermal balance is maintained with the combustion heat from combustion chamber 18. At this stage, the fuel cell module is in the final stages of startup, therefore the temperature has risen to a sufficiently high level within generating chamber 10 so that no major temperature dropped is induced in generating chamber 10 even though an endothermic reaction is proceeding. Also, the combustion reaction continues to proceed in combustion chamber 18 even as the steam reforming reaction SR is proceeding.

Thus, after fuel cell module 2 has been ignited by ignition device 83, the temperature inside generating chamber 10 gradually rises as a result of the partial oxidation reforming reaction POX, the auto-thermal reforming reaction ATR, and the steam reforming reaction SR proceeding in sequence. Next, when the temperatures of interior of generating chamber 10 and individual fuel cells 84 reach a predetermined generating temperature below the rated temperature at which fuel cell module 2 can be stably operated, the circuit including fuel cell module 2 is closed and electrical generation by fuel cell module 2 begins, such that current flows in the circuit. Generation of electricity by fuel cell module 2 causes fuel cell 84 itself to emit heat, such that the temperature of fuel cell 84 rises. As a result, the rated temperature for operating fuel cell module 2, for example 600° C. to 800° C., is reached.

Thereafter, in order to maintain the rated temperature, fuel gas and air are supplied in a quantity greater than the fuel gas and air consumed by individual fuel cells 84. During electrical generation, generation of electricity by the high reforming efficiency steam reforming reaction SR proceeds.

Figure 8:
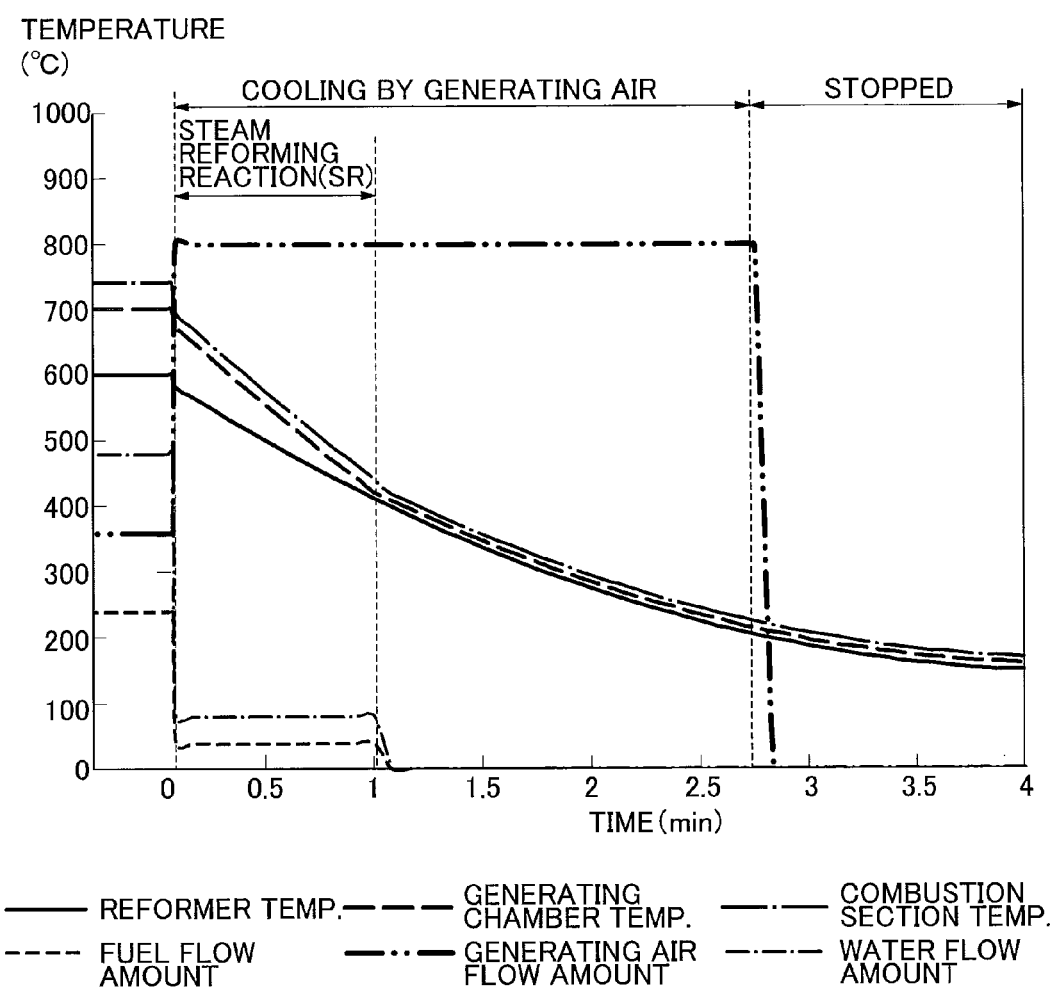
FIG. 8 is a timing chart showing what occurs upon stopping the operation of a fuel cell according to an embodiment of the present invention.

Next, referring to FIG. 8, we discuss the operation upon stopping the solid oxide fuel cell (SOFC) of the present embodiment. FIG. 8 is a timing chart showing what occurs upon stopping the operation of solid oxide fuel cell (SOFC) of the present embodiment.

As shown in FIG. 8, when the operation of fuel cell module 2 is stopped, fuel flow regulator unit 38 and water flow regulator unit 28 are first controlled to reduce the quantity of fuel gas and steam being supplied to reformer 20.

When stopping the operation of the fuel cell module 2, the amount of generating air supplied by reforming airflow regulator unit 44 into fuel cell module 2 is being increased at the same time that the amount of fuel gas and steam being supplied to reformer 20 is being reduced; fuel cell assembly 12 and reformer 20 are air cooled to reduce their temperatures. Thereafter when the reformer 20 temperature has dropped to a predetermined temperature, for example to 400° C., supply of fuel gas and steam to the reformer 20 is stopped, and the reformer 20 steam reforming reaction SR ends. Supply of generating air continues until the temperature in reformer 20 reaches a predetermined temperature, e.g. 200° C.; when the predetermined temperature is reached, the supply of generating air from generating airflow regulator unit 45 is stopped.

Thus in the present embodiment the steam reforming reaction SR by reformer 20 and cooling by generating air are used in combination, therefore when operation of the fuel cell module 2 is stopped, that operation can be stopped relatively quickly.

Figure 9:
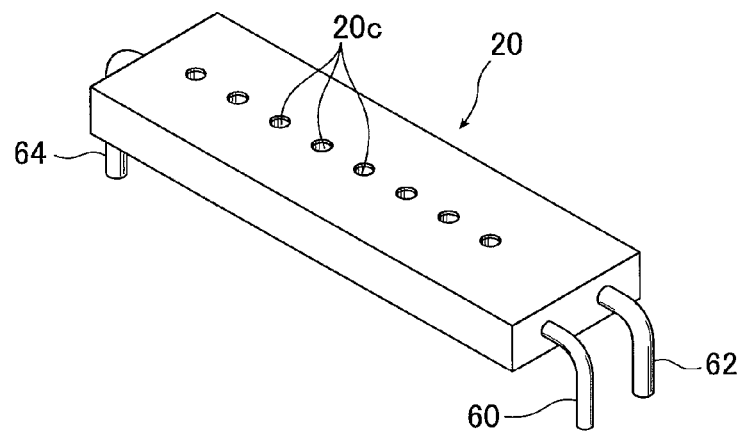
FIG. 9 is a front elevation cross section showing the fuel cell module of a fuel cell apparatus according to an embodiment of the present invention.
Figure 10:
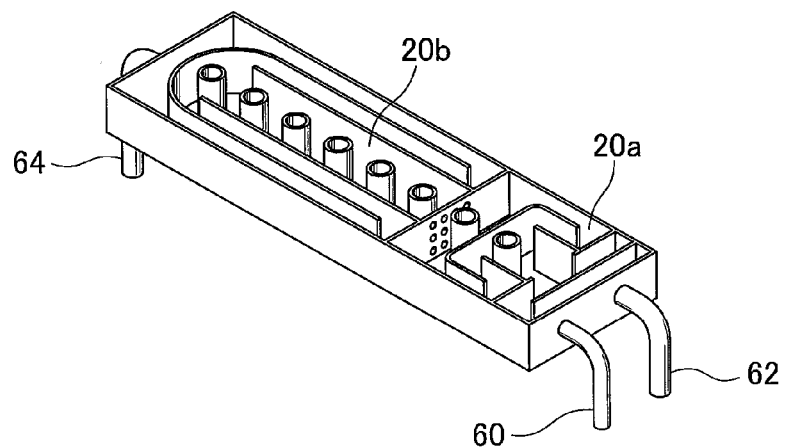
FIG. 10 is a perspective view showing the interior of a reformer with the top plate removed with a reformer built into a fuel cell apparatus according to an embodiment of the present invention.
Figure 11:
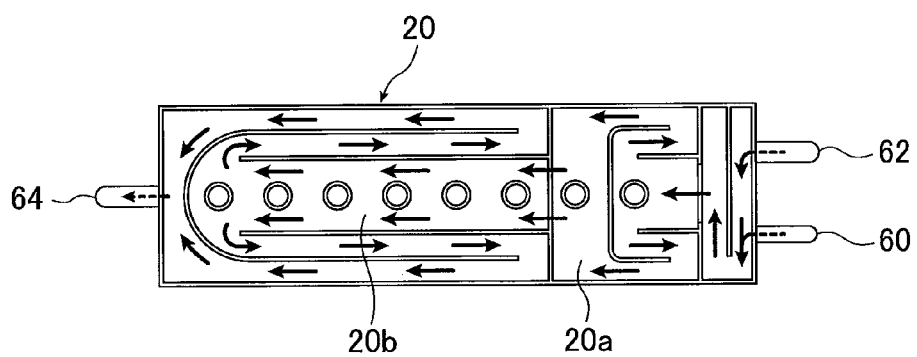
FIG. 11 is a plan view showing the flow of fuel inside a reformer built into a fuel cell apparatus according to an embodiment of the present invention.

Next, referring to FIGS. 9 through 11, we discuss the detailed constitution of reformer 20.

FIG. 9 is a perspective view of reformer 20; FIG. 10 is a perspective view showing the interior of reformer 20 with the top plate removed. FIG. 11 is a plan view section showing the flow of fuel in reformer 20.

As shown in FIG. 9, reformer 20 is a parallepiped-shaped metal box disposed on top of fuel cell stack 14 inside fuel cell module 2, the interior of which is filled with a reforming catalyst for reforming fuel. Connected on the upstream side of reformer 20 is a pure water infeed pipe 60 for introducing water and a reformed gas infeed pipe 62 for introducing fuel and reforming air. In addition, connected on the downstream side of reformer 20 is a fuel gas supply pipe 64 for discharging fuel reformed in the interior of reformer 20. There are also eight air passage openings 20c placed in the longitudinal direction on reformer 20. These reformers 20 are placed so as to penetrate from the bottom surface to the top surface of reformer 20 in such a way that combustion gas combusted in combustion chamber 18 (FIG. 2) at the bottom of reformer 20 will be smoothly removed from the top of reformer 20, and air passage openings 20c do not communicate with the interior of reformer 20.

As shown in FIG. 10, placed on the interior of reformer 20 on the upstream side is a steam generating section 20a, which is a steam generating chamber; placed adjacent to this steam generating section 20a on the downstream side is a reformer section 20b. A twisted passageway is formed within steam generating section 20a by the disposition of multiple partitioning plates. Water introduced from the water flow regulator unit 28, being a water supply device, to reformer 20 is vaporized inside vaporizing section 20a in an elevated temperature state, and becomes steam. Fuel gas and reforming air introduced into reformer 20 are mixed with steam as they pass through a twisting and turning passageway in vaporizing section 20a. Note that in the present embodiment vaporizing section 20a and reformer section 20b are formed as an integral unit inside reformer 20, but vaporizing section (steam producing chamber) 20a and reformer section 20b may also be separately constituted.

At the same time, a twisted passageway is formed inside reformer section 20b, as well, by the disposition of multiple partitioning plates, and is filled with catalyst. Fuel gas and reforming air blended in vaporizing section 20a are subjected to the partial oxidation reforming reaction as they pass through the passageway in reformer section 20b. When a mixture of fuel gas, steam, and reforming air are introduced from vaporizing section 20a, a partial oxidation reforming reaction and a steam reforming reaction occur in reformer section 20b. Furthermore, when a mixture of fuel gas, steam, and reforming air are introduced from vaporizing section 20a, only the steam reforming reaction occurs in reformer section 20b.

As shown in FIG. 11, fuel gas, water, and reforming air introduced into the reformer 20 steam generating section 20a first flows in a snaking manner in the lateral direction of reformer 20, then is split into two passageways and snakes in the longitudinal direction of reformer 20. Furthermore, the passageways then re-merge and are connected to reformer section 20b at the center part of reformer 20. After flowing longitudinally at the center of reformer 20, fuel and the like introduced into reformer section 20b are branched into two parts and doubled back; the two passageways again double back and move toward the downstream end of reformer section 20b; there they are merged, flowing into fuel gas supply pipe 64. As it thus passes through the snaking passageway, fuel etc. is reformed by the catalyst with which the passageway is filled.

Figure 14:
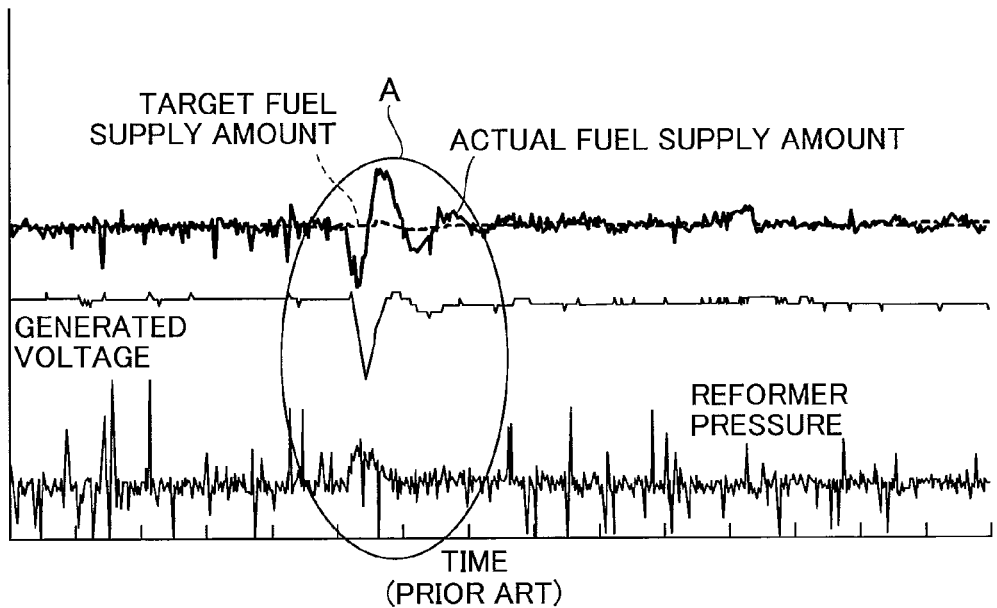
FIG. 14 is a graph showing a time line example of the operational states of a conventional solid oxide fuel cell during electrical generating operation.
Figure 15:
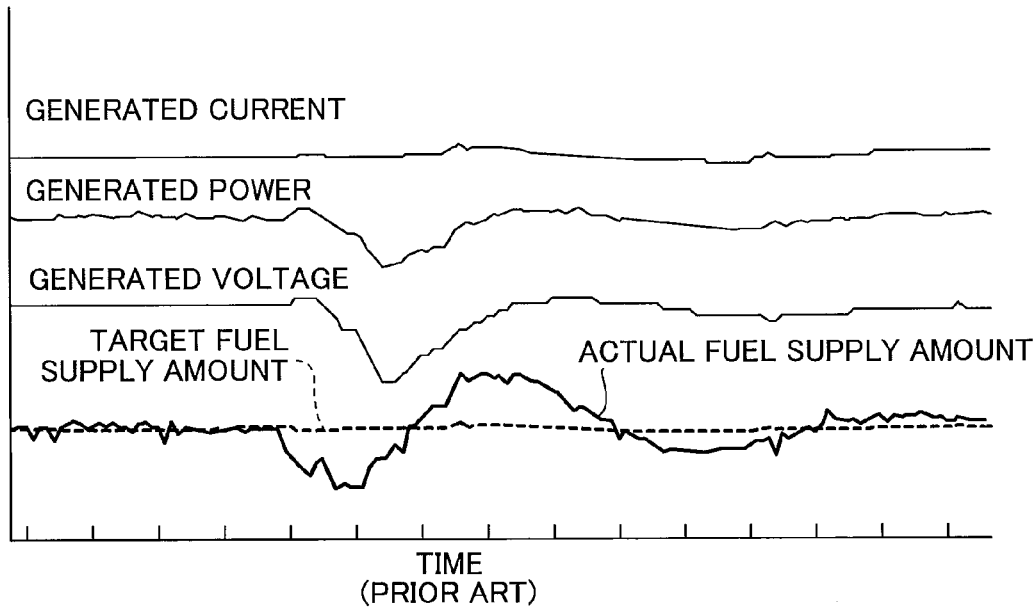
FIG. 15 is a diagram showing an expanded view of the part in which excessive bumping is occurring within the FIG. 14 graph.

Next, referring to FIGS. 14 and 15, we discuss the bumping phenomenon in the vaporizing section of a conventional solid oxide fuel cell. FIG. 14 is a graph showing a time line example of the operational states of a conventional solid oxide fuel cell during electrical generating operation. FIG. 15 shows an expanded view of the part in which excessive bumping is occurring within the FIG. 14 graph.

In the topmost graph in FIG. 14, the dotted line shows target fuel supply values, and the solid line shows actual fuel supply amounts. The middle graph in FIG. 14 is the output voltage from the fuel cell module, and the bottom graph shows pressure inside the vaporizing section of the reformer. FIG. 15 shows an expanded view of the time axis in the part of FIG. 14 where excessive bumping is occurring; the top graph shows generated current, the second graph generated power, the third graph the output voltage of the fuel cell module; in the bottom graph the dotted line shows target fuel supply values, and the solid line shows actual fuel supply amounts.

As shown by the bottommost graph in FIG. 14, pressure inside the reformer fluctuates dramatically over time. The primary reason for such pressure fluctuations is believed to be the bumping phenomenon, whereby tiny amounts of water droplets in the reformer boil instantaneously. I.e., because the volume of water expands by approximately 300 times when boiled, the pressure inside the reformer rises suddenly as water is boiled. Thus the bumping phenomenon occurs extremely frequently, and even if water is supplied continuously it is difficult to completely eliminate the occurrence of bumping. However, the majority of bumping-induced pressure fluctuations inside a reformer are concentrated in an extremely short time period, and do not greatly affect the flow volume of fuel gas introduced into the reformer. In addition, there is virtually no change in the fuel cell module output-voltage even if pressures inside the reformer fluctuate severely. This is thought to be because fuel flowing out of the reformer is generally first stored in the manifold, which is a dispersion chamber, then distributed from there to multiple fuel cell units. I.e., it is believed that fluctuations in fuel supply amount caused by short duration pressure fluctuations are made uniform inside the manifold, and have virtually no effect on the fuel actually distributed to each of the fuel cell units.

However, in the part shown as A in FIG. 14, major bumping occurs, and pressures inside the reformer rise over a relatively long time period. In addition, as is clear from FIG. 15, in which the time axis is expanded for the part in which transient bumping occurs, there are also large fluctuations in the flow volumes of fuel gas introduced into the reformer when excess bumping occurs in this manner. As shown in the bottom portion of FIG. 15, when excessive bumping occurs, the fuel supply amounts introduced into the reformer are reduced over a comparatively long time. Feedback control acts on such reductions in fuel gas supply amounts, and fuel supply amounts are brought into convergence with fuel supply target values as overshooting is repeated. However, as shown in the third graph of in FIG. 15, after approximately 5 seconds following the start of reduction in the fuel supply amount, the output voltage of the fuel cell module begins to drop. This drop in output voltage is caused by a drop in the concentration of fuel supplied to each of the fuel cell units due to the temporary drop in fuel supply amount, causing the generating capacity of each fuel cell unit to drops. I.e., it is believed that a voltage drop occurs because a fixed current is extracted from the fuel cell module, even though in this state the fuel supply amount and generating capacity have dropped.

Thus the present inventors have discovered a new technical problem in that when the generating capacity of each fuel cell unit has dropped, each of the fuel cell units temporarily goes into a state close to "fuel depletion" due to the extraction of current (power) higher than generating capacity, causing degradation in each of the fuel cell units to advance. As described above, bumping of steam reforming water occurs frequently in the reformer vaporizing section, and it has been difficult to avoid the occurrence of such bumping. In addition, because a large amount of such bumping is small in scale, effects are minor on actual fuel supply amounts, generating capacity of each fuel cell unit, and the like. However there is also large-scale bumping among the frequently occurring bumping, and when such excessive boiling of water occurs, the actual fuel supply amount drops for a certain time period and the associated "fuel depletion" or "fuel shortage" causes the advance of the degradation of each fuel cell units, reducing the number of usable years of the fuel cell units. The present invention was undertaken to resolve such technical problems.

Figure 12:
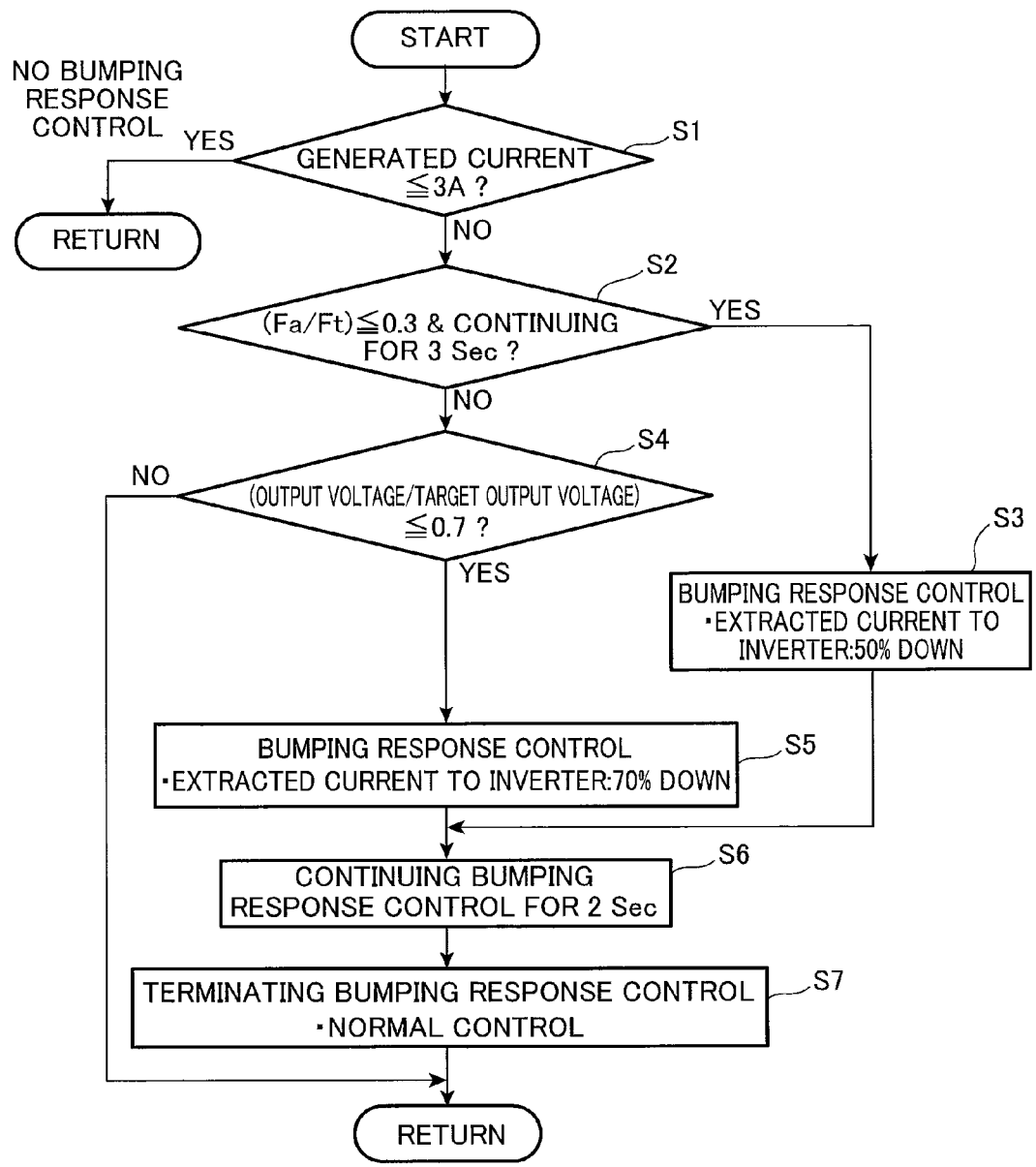
FIG. 12 is a control flowchart for a solid oxide fuel cell apparatus according to an embodiment of the present invention.
Figure 13:
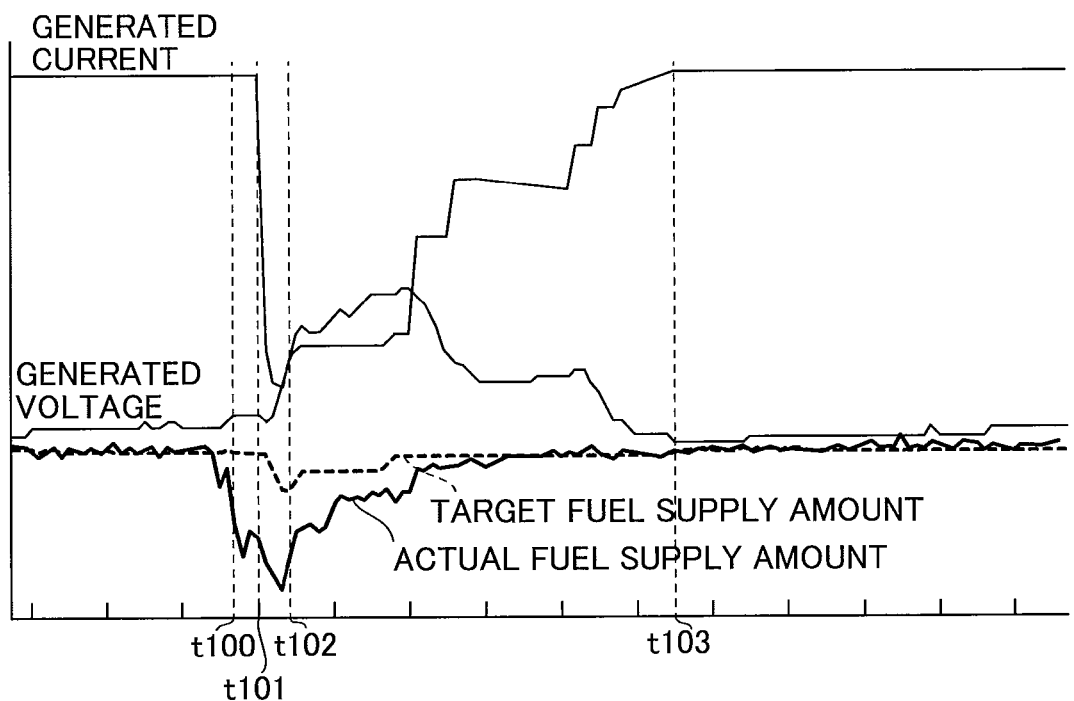
FIG. 13 is a timing chart showing an example of the control results from the FIG. 12 flow chart.

Next, referring to the FIGS. 12 and 13, we discuss control in a solid oxide fuel cell 1 according to an embodiment of the present invention.

FIG. 12 is a control flowchart for the solid oxide fuel cell 1 of the present embodiment. FIG. 13 is a timing chart showing an example of the control results in the FIG. 12 flow chart.

The flow chart shown in FIG. 12 is a control subroutine to respond to excessive bumping occurring in the vaporizing section 20a of reformer 20, and is executed at a predetermined time cycle during the electrical generating operation of solid oxide fuel cell 1.

First, at step S1 in FIG. 12, a judgment is made as to whether current generated by fuel cell module 2 is at or below a predetermined current. In the present embodiment, when generated current is greater than 3 A, the system advances to step S2; when less than or equal to 3 A, one iteration of the processing shown in the FIG. 12 flow chart is completed. I.e., control to counter bumping is not executed when generated current is 3 A or less; when greater than 3 A, control to counter bumping is executed as needed. Note that in the present embodiment, a judgment of whether or not to perform control for bumping is made based on fuel cell module 2 generated current, but a determination can also be made based on generated power.

In the solid oxide fuel cell 1 of the present embodiment an oxide ion conductive solid electrolyte is used as the electrolyte, and electrical generation is carried out with the interior of fuel cell module 2 maintained at a relatively high generating temperature. Therefore a portion of supplied fuel does not contribute to electrical generation, but is instead used to maintain the generating temperature inside fuel cell module 2. As described above, when residual fuel flowing through the inside of each individual fuel cell unit 16 remains without being used to generate electricity, it is combusted when it flows down from the top end of each of the individual fuel cell units 16; this combustion heat is then used to maintain the temperature inside fuel cell module 2. Thus since a predetermined amount of supplied fuel is used to maintain temperature inside fuel cell module 2, the fuel utilization rate (the portion of supplied fuel utilized for electrical generation) is set to be high in the region where the generated current (generated power) at which an increase in the amount of fuel used for electrical generation occurs is set high, and is set low in the region where generating current (generating power) is small.

Therefore in the small generated current region in which generated current is 3 A or less, the fuel utilization rate is set low, so fuel approximately equal to what is used for electrical generation is supplied even when the fuel supply amount has temporarily dropped due to excessive bumping, and there is no risk that fuel used for electrical generation will be insufficient (at this point, residual fuel used to maintain temperature is reduced). Hence in the present embodiment when generated current is at or below 3 A, no control to respond to bumping is executed. Thus in a state whereby the system does not experience fuel shortages, performing a control for bumping enables the prevention of destabilization of the fuel cell module 2 state, excessive temperature drops, and the like.

Next, in step S2 of FIG. 12, a determination is made by bumping determination circuit 110*a* (FIG. 6) as to whether excessive bumping is occurring in the vaporizing section 20*a* of reformer 20; if excessive bumping is occurring, the system advances to step S3; if it is not occurring, the system advances to step S4. Specifically, control section 110, which is a controller, controls fuel flow regulator unit 38, which is a fuel supply device, so that target fuel supply amount Ft, set in accordance with required generated power, is supplied to reformer 20. The fuel amount Fa actually sent by fuel flow regulator unit 38 to reformer 20 is measured by fuel flow volume sensor 132, a fuel supply amount detection circuit (FIG. 6). If a state continues for a predetermined time or greater in which the amount of fuel Fa actually supplied declines by a predetermined amount or more relative to the target fuel supply amount Ft, it is determined that excessive bumping is occurring inside vaporizing section 20*a*. In the present embodiment, if there is a 70% or greater drop in supplied fuel amount Fa relative to the target fuel supply amount Ft, i.e., if the state whereby (Fa/Ft)≤0.3 continues for 3 seconds or more, a determination is made that excessive bumping is occurring.

FIG. 3 is a time chart showing an example of the control results for a control on bumping; the topmost graph shows fuel cell module 2 generated current, the second graph shows fuel cell module 2 output voltage, and the last graph shows actually supplied fuel amount Fa with a solid line and target fuel supply amount Ft with a dotted line. In the FIG. 13 example, at time t100 the actually supplied fuel supply amount Fa has dropped by 70% or more relative to target fuel supply amount Ft, and at time t101 three seconds after time t100 a determination is made by bumping determination circuit 110*a* that excessive bumping has occurred.

Next, at step S3 in FIG. 12, extracted power limiting circuit 110*b*, which is built into control section 110 (FIG. 6), limits current extracted from fuel cell module 2 to inverter 54 as a bumping response control. In the example shown in FIG. 13, when a determination is made at time t101 that excessive bumping has occurred, extracted power limiting circuit 110*b* reduces generated current by 50% and limits the extraction of power.

In the conventional solid oxide fuel cell shown in FIG. 15, the fuel cell module output voltage drops after excessive bumping has occurred. This is because the actual fuel supply amount declines by more than the target fuel supply amount due to the occurrence of excessive bumping, and if the electrical generating capacity of the fuel cell stack has declined, the same current is extracted from the fuel cell module as before the occurrence of bumping. Voltage drops of this type place a burden on each of the fuel cell units constituting the fuel cell stack, and cause the degradation of each fuel cell unit to advance. By contrast, in FIG. 13 of the present embodiment after it is determined that excessive bumping has occurred at time t101, extraction of power is limited by reducing the current extracted from fuel cell module 2, so that a drop in output voltage is avoided. Note that in the present embodiment after the actually supplied fuel amount Fa has begun to drop, the system limits extracted power after waiting to determine if this state continues for 3 seconds, but a decline in fuel cell module 2 output voltage can be avoided. Here, fuel flowing out from reformer 20 passes through fuel gas supply pipe 64 and manifold 66, which is a dispersion chamber, and reaches each of the individual fuel cell units 16. Therefore after the actual fuel supply amount introduced into reformer 20 begins to decline, the effect thereof extends to each of the individual fuel cell units 16, and there is a time lag of approximately 5 seconds until voltage begins to drop. Therefore voltage drops can be avoided even after a determination is made of whether a drop in fuel supply amount has continued for a predetermined time. In the example shown in FIG. 13, because extraction of more power than the amount of the decline in generated power caused by the decline in the actual fuel supply amount is suppressed, the fuel cell module 2 output voltage conversely rises.

With respect to limiting the extraction of power by extracted power limiting circuit 110*b*, it is preferable to maintain extraction of a predetermined amount of power or greater while reducing to 50% or less the power extracted from fuel cell module 2. This is because even if excessive bumping is occurring, the amount of fuel actually supplied does not decline to zero, and supply of a certain amount of fuel continues. Therefore if extraction of power from fuel cell module 2 is completely stopped, the problem arises that not only does excess fuel not contributing to electrical generation increase, but the temperature inside fuel cell module 2 rises excessively due to the combustion of large amounts of surplus fuel. To avoid such problems, if there is a determination that excessive bumping has occurred, it is preferable to maintain the extraction of power even as extracted power is being greatly reduced. However, depending on the scale of bumping estimated to occur inside the reformer, and on conditions such as fuel cell module heat insulation characteristics, it is also possible to completely stop the extraction of power as part of the limitation of power extraction.

The limiting of power extraction begun in step S3 of FIG. 12 is continued for approximately 2 seconds in step S6 which follows. Next, in step S7, the bumping control for limiting power extraction ends, and one iteration of the processing shown in FIG. 12 is completed. In the example shown in FIG. 13, limitation of power extraction ends at time t102. Note that as shown in FIG. 13, in the present embodiment even after the limiting of power extraction at time t102 ends, the amount of power extracted does not instantaneously return to the pre-limiting level; rather the extraction amount is gradually recovered, so that at time t103 it is restored to the pre-limiting level. In the present embodiment, this control is the normal control when increasing the amount of power extracted, and a similar control is executed, for example, when increasing the amount of power extracted in response to an increase in demand power.

In step S2 of FIG. 12, on the other hand, if no determination is made of excessive bumping, the system advances to step S4; at step S4 a judgment is made as to whether the fuel cell module 2 output voltage is at an appropriate value. Specifically, a judgment is made of whether fuel cell module 2 output voltage Va as measured by electrical power state detecting sensor 126, which is an output voltage detection circuit, has dropped by a predetermined amount or more relative to target output voltage Vt. In the present embodiment the judgment of whether output voltage Va is 30% or more below target output voltage Vt, i.e. whether the voltage has dropped to the point that (Va/Vt)≤0.7, is made by bumping determination circuit 110a. If the voltage has fallen the system advances to step S5; if it has not fallen, one iteration of the processing in flowchart 1 of FIG. 12 is completed.

As described above, if excessive bumping occurs and extraction of power is maintained when the generating capacity of fuel cell stack 14 has dropped, the fuel cell module 2 output voltage declines. Also, output voltage drops as output current increases even if fuel cell module 2 is being operated normally, therefore the optimal output voltage estimated for each output current is pre-set as the target output voltage Vt. In step S4 a determination is made of the proportion of the decline in measured output voltage Va relative to the target output voltage Vt estimated in this way for each output current. If output voltage Va has dropped greatly relative to estimated target output voltage Vt, there is a high possibility that excessive bumping has occurred even if a continuous decline in the amount of fuel Fa actually supplied is not observed, so bumping determination circuit 110a judges that excessive bumping has occurred.

When a judgment is made that excessive bumping has occurred, the current extracted from fuel cell module 2 to inverter 54 is reduced 70% by extracted power limiting circuit 110b in step S5 as a control against bumping. I.e., the current extracted from fuel cell module 2 is limited to 30% of the value prior to limiting power extraction. The limiting of power extraction started in step S5 of FIG. 12 is continued for approximately 2 seconds in step S6 which follows. Next, in step S7, bumping control to limit power extraction ends, and one iteration of the processing shown in FIG. 12 is completed.

Note that in step S2, when a continuous decline in fuel supply amount Fa is observed, the current extracted from fuel cell module 2 is reduced by 50%, whereas when a determination is made in step S5 of a decline in output voltage, extracted current is reduced by a larger 70%. Thus there is much greater limiting when power extraction is limited based on a decline in output voltage than when limiting is based on a continuous decline in fuel supply amount Fa. This is done in order to more reliably protect each of the individual fuel cell units 16 by more greatly reducing the amount of electrical generation, because when fuel cell module 2 output voltage is beginning to drop, fuel shortages in each of the individual fuel cell units 16 have already started.

Also, even when no determination of a continuous drop in fuel supply amount Fa is made, a determination that excessive bumping has occurred is made using the decline in output voltage as a backup, so that even when a continuous decline in fuel supply amount Fa cannot be detected, the negative effects of an excessive bumping occurrence can be suppressed. When a decline in output voltage is detected, limits on the extraction of power are immediately started, therefore even after the detection of a voltage drop, the negative effects on each of the individual fuel cell units 16 can be kept to a minimum.

Using the solid oxide fuel cell 1 of the present embodiment of the invention, the power extracted from fuel cell module 2 is limited (FIG. 12, steps S3, S5) by extracted power limiting circuit 110b when a determination of excessive bumping in water within vaporizing section 20a is made by bumping determination circuit 110a. Extraction of power in excess of generating capacity from a fuel cell stack 14 in which generated capacity has declined due to the effects of bumping inside vaporizing section 20a is thus suppressed, therefore degradation of fuel cell stack 14 is suppressed, and the number of lifespan years can be dramatically improved.

Also, using solid oxide fuel cell 1 of the present embodiment, the placement of manifold 66 (FIG. 2) results in a time lag before the effects of the fuel reduction reach each of the individual fuel cell units 16. Therefore bumping determination circuit 110a determines the occurrence of excessive bumping after identifying whether the decline in fuel supply amount has continued for a predetermined time (FIG. 12, step S2), and even when power has been limited, the negative effects on each of the individual fuel cell units 16 can be fully suppressed. The occurrence of excessive bumping can thus be accurately determined, and the operation of fuel cell module 2 can be prevented from becoming unstable due to repeated unnecessary limitations of power caused by false determinations.

Furthermore, excessive bumping of water caused by output voltage drops can be determined (FIG. 12, step S4) using the solid oxide fuel cell 1 of the present embodiment, therefore even when excessive bumping cannot be detected by determinations based on fuel supply amount (FIG. 12, step S2), control against bumping can be reliably executed. In addition, because "fuel depletion" or "fuel shortages" based on excessive bumping of water continue for a certain period of time (FIG. 15), negative effects on fuel cell stack 14 can be sufficiently reduced even when there has been a response to bumping following a drop in output voltage.

Also, using the solid oxide fuel cell 1 of the present embodiment, extraction of power at or above a predetermined amount is maintained even when power is limited (FIG. 12, steps S3, S5), therefore excess temperature rises of fuel cell module 2 caused by increases in surplus fuel can be prevented while avoiding "fuel depletions" or "fuel shortages" in fuel cell stack 14.

Moreover, using solid oxide fuel cell 1 of the present embodiment, extracted power limiting circuit 110b does not execute power limiting when the current generated by fuel cell module 2 is at or below a predetermined amount (FIG. 12, step S1). Therefore in the region in which generated power (current) is at or below a predetermined amount, where it is clear that "fuel depletions" or "fuel shortages" caused by excessive bumping do not occur, unnecessary power limits can be avoided by a simple control.

Above we have described a preferred embodiment of the present invention, but various changes may be added to the above-described embodiments.

Also, in the above-described embodiment, when generated current is 3 A or below, bumping control is not implemented (FIG. 12, step S1), but as a variant example it is possible to change the limiting of power extracted from fuel cell module 2 in response to generated current or generated power. For example, the present invention can be constituted so that in a state where the power generated by fuel cell module 2 is large, the power extracted from fuel cell module 2 is limited much more (extracted power reduced) than when generated power is small.

In the present variant example, when generated power is large, power is limited much more than when generated power is small, therefore unnecessary limiting of power can be prevented when power is small, while reliably avoiding "fuel depletions" or "fuel shortages" during larger power output, when fuel utilization rate is high.

What is claimed is:

1. A solid oxide fuel cell system for generating electrical power using reformed fuel reformed by adding steam to supplied fuel, comprising:
   a fuel cell module including a plurality of fuel cell units;
   a fuel supply device configured to supply fuel;
   a reforming chamber configured to react the fuel supplied from the fuel supply device with steam to reform the supplied fuel and supply the reformed fuel to the fuel cell module;
   a vaporization chamber disposed on the upstream side of the reforming chamber and configured to generate the steam therein and supply the generated steam to the reforming chamber;
   a water supply device configured to supply water to the vaporization chamber for vaporization of the water to generate the steam;
   a controller programmed to control the fuel supply device and the water supply device, and to control extraction of electric power from the fuel cell module, wherein the controller includes a bumping determination circuit and an extracted power limiting circuit,
   wherein the bumping determination circuit is programmed to determine an occurrence of excessive and sudden vaporization of water in the vaporization chamber, and
   wherein the extracted power limiting circuit is programmed to reduce extraction of the electrical power from the fuel cell module when the bumping determination circuit determines an occurrence of excessive and sudden vaporization of water in the vaporization chamber.

2. The solid oxide fuel cell system of claim 1, further comprising (i) a fuel supply amount detection circuit operable to detect an amount of the fuel supply into the reforming chamber and (ii) a dispersion chamber configured to accumulate the reformed fuel therein and distribute the reformed fuel to each of the fuel cell units,
   wherein the bumping determination circuit is programmed to determine an occurrence of excessive and sudden vaporization of water in the vaporization chamber when the fuel supply amount detection circuit detects that a decrease of the amount of fuel supply below a target amount of fuel supply by a predetermined amount or more continues for a predetermined time duration or more.

3. The solid oxide fuel cell system of claim 2, further comprising an output voltage detection circuit operable to detect an output voltage of the fuel cell module,
   wherein the bumping determination circuit is programmed to determine an occurrence of excessive and sudden vaporization of water in the vaporization chamber when the output voltage detection circuit detects a decrease of the output voltage below a target output voltage by a predetermined voltage or more.

4. The solid oxide fuel cell system of claim 3, wherein the extracted power limiting circuit is programmed to reduce extraction of the electrical power from the fuel cell module to a predetermined electrical power which is not zero.

5. The solid oxide fuel cell system of claim 1, wherein the extracted power limiting circuit is programmed to reduce extraction of the power from the fuel cell module to a larger degree when the power generated by the fuel cell module is at a first level than when generated power is at a second level which is lower than the first level.

6. The solid oxide fuel cell system of claim 5, wherein only under a condition that electricity generated by the fuel cell module is above a predetermined amount, the extracted power limiting circuit is operable to reduce extraction of electrical power from the fuel cell module when the bumping determination circuit determines an occurrence of excessive and sudden vaporization of water in the vaporization chamber.

* * * * *